United States Patent Office 3,388,969
Patented June 18, 1968

3,388,969
PROCESS FOR THE PREPARATION OF
PHOSPHORUS OXYBROMIDE
Richard C. Nametz, St. Louis, and John H. Todd, Alma, Mich., assignors to Michigan Chemical Corporation, St. Louis, Mich., a corporation of Michigan
No Drawing. Filed Nov. 6, 1963, Ser. No. 321,658
7 Claims. (Cl. 23—203)

This invention relates to a process for the preparation of phosphorus oxybromide. More particularly, this invention relates to the utilization of the reaction of phosphorus tribromide, bromine and phosphorus pentoxide by the process of the present invention to produce phosphorus oxybromide. Further, the present invention in addition relates to the utilization of the reaction of bromine with phosphorus to produce the phosphorus tribromide reactant by the process of the present invention.

Phosphorus oxybromide is a useful intermediate for the manufacture of flame retardant compounds, for use in various resins, for the preparation of pharmaceutical intermediates, pesticides, and the like. Thus a simple and economical process for the preparation of this compound is needed.

The known prior art processes for the preparation of phosphorus oxyhalides, particularly phosphorus oxybromide, suffer from various disadvantages. Included among these disadvantages are: low yield of the phosphorus oxyhalide; poor utilization of the halogen, in terms of incorporation into the phosphorus oxyhalide product rather than other reaction products; the formation of explosive mixtures; and/or extreme reaction conditions. These factors contribute to the result that the prior are processes produce an expensive phosphorus oxyhalide product.

The prior art has prepared phosphorus oxybromide by the reaction of phosphorus pentoxide with phosphorus pentabromide. This reaction, when the reactants are used in stoichiometric ratio of three moles of phosphorus pentabromide per one mole of phosphorus pentoxide, has the advantage in theory of the complete utilization of the reactants to form the phosphorus oxybromide product. However, processes based upon this reaction have been found to be uneconomical for various reasons including: extended reaction times; the requirement of anhydrous conditions; difficulty in the handling of phosphorus pentabromide which is a solid and highly corrosive; and finally difficulty in combining or blending the solid reactants phosphorus pentabromide and phosphorus pentoxide. These factors contribute to the result that expensive phosphorus oxybromide is produced.

It is therefore an object of the present invention to provide a process for the preparation of phosphorus oxybromide in high yield and with relatively short reaction times.

Further it is an object of the present invention to provide a process for the preparation of phosphorus oxybromide which is simple and economical, thereby producing relatively inexpensive phosphorus oxybromide.

These and other objects will become increasingly apparent to those skilled in the art by reference to the following description.

The objects of the present invention are accomplished by providing a process for the preparation of phosphorus oxybromide which comprises providing a semi-fluid mixture comprising phosphorus pentoxide and phosphorus tribromide at a temperature less than the decomposition temperature of phosphorus pentabromide, introducing bromine into the semi-fluid mixture at a rate which maintains the resulting reaction mixture in a semi-fluid state at a temperature less than the decomposition temperature of phosphorus pentabromide, heating the reaction mixture until the reaction goes substantially to completion to produce a liquid phosphorus oxybromide product and recovering the phosphorus oxybromide product from the reaction mixture. The process of the present invention contemplates that the initial semi-fluid mixture, in the foregoing process, can be provided by reacting phosphorus with bromine in the presence of phosphorus oxybromide and phosphorus pentoxide. It is further contemplated that the reaction mixture resulting from the process of the present invention can be recycled and reprocessed to improve the overall yield.

The general reaction utilized in the process of the present invention is chemically characterized as follows:

(1) $3PBr_3 + 3Br_2 + P_2O_5 \rightarrow 5POBr_3$ 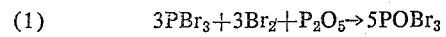

In those instances where phosphorus is used as the initial reactant instead of phosphorus tribromide the reactions utilized in the process of the present invention are as follows:

(2) $2P + 3Br_2 \rightarrow 2PBr_3$ 

with subsequent reaction as in (1) above to produce the product phosphorus oxybromide.

The principal reaction utilized in the prior art processes is as follows:

(3) $3PBr_5 + P_2O_5 \rightarrow 5POBr_3$ 

The main operating disadvantages of processes based upon this reaction are that the reactants are solid and the reaction times are very long, as has been previously discussed.

It was found that by conducting the reaction (2) and/or (1) in a semi-fluid state according to the process of the present invention that phosphorus oxybromide could unexpectedly be produced in high yield and with relatively short reaction times using simple procedures and equipment. Illustrative are the following Examples I, II and III.

Example I

A one liter, three-neck flask, fitted with a paddle type agitator, thermometer, thermometer well and a "Y" adapter which held a bulb condenser and a dropping funnel, was used as equipment.

Phosphorus pentoxide (323.0 g, 2.28 moles) and phosphorus tribromide (1086.0 g., 4.0 moles) were introduced into the flask. A molar excess of phosphorus pentoxide was used (71.4 mole percent excess) over the stoichiometric ratio of 1 to 3, with respect to phosphorus tribromide, shown by Equation 1 above. This mixture was heated to 90° C. Bromine (319.6 g, 4.0 moles) was added slowly to the mixture with agitation over a period of 2¾ hrs., making sure that the resulting reaction mixture remained fluid, while the temperature of the reaction mixture was maintained between 91–105° C. After the bromine addition was completed, the temperature of the reaction mixture was slowly increased from 105° C. to 169° C. over a period of 10 hrs.

After the heating period was completed, phosphorus oxybromide was in the form of a liquid, with solid excess phosphorus pentoxide on its surface. The product was distilled from the reaction mixture. The product could be decanted or filtered from the reaction mixture. This would facilitate the subsequent distillation of the phosphorus oxybromide from the reaction mixture.

The reactor flask was arranged to serve as a distillation pot with a spray trap, Vigreux column, simple fraction head and receiver attached. A vacuum pump was connected to the distillation apparatus.

A forecut was distilled at a head temperature of 71° C. at 9 torr (pressure as millimeters of mercury supported in a Torricelian tube). At this temperature and pressure all bromine was distilled from the product. There was 152.2 grams of forecut distilled from the flask. The forecut was then separately redistilled to yield 143.0 g. of phosphorus oxybromide.

The main fraction containing the product, phosphorus oxybromide, was distilled at 71°–77° C. with the pressure between 9–15 torr. There was 1631.0 g. of product recovered. Thus the total phosphorus oxybromide recovered was 1774.0 g. This amounted to an efficiency of 93% based upon bromine and phosphorus tribromide.

The residue weighed 243.0 grams. The residue was calculated to contain 95 grams of phosphorus oxybromide, the calculation being based upon the theoretical amount of phosphorus pentoxide consumed in forming the product obtained upon distillation. If this were extracted from the residue, the efficiency of the process of this example would have been 97.7%. Thus it became apparent that the residue should be incorporated into the next run to permit the recovery of the phosphorus oxybromide it contained.

Illustrative of the use of the residue from previous runs in later runs are the runs shown in Table I. In each instance the residue was added to the next run but in all other respects the runs were identical to Example I.

TABLE I

| Run | $Br_2$ | $PBr_3$ | $P_2O_5$ | Mole Percent Excess $P_2O_5$ |
|---|---|---|---|---|
| 1 | 4.0 | 4.0 | 2.88 | 71.5 |
| 2 | 4.0 | 4.0 | 1.55 | [1] 16.5 |
| 3 | 4.0 | 4.0 | 1.63 | [1] 22.5 |
| 4 | 4.0 | 4.0 | 1.63 | [1] 22.5 |

| Run | Total Reaction time in hours | Product wt. in moles | Material Balance, Percent | Percent Efficiency based on $Br_2$ and $PBr_3$ |
|---|---|---|---|---|
| 1 | 11.25 | 5.24 | 94.0 | 78.5 |
| 2 | 15.0 | 5.77 | 97.8 | 86.5 |
| 3 | 13.0 | 6.5 | 99.4 | 97.5 |
| 4 | 11.0 | [2] 6.92 | 97.2 | 103.8 |

[1] There was an additional amount of phosphorus pentoxide added which was in the residue from the previous run.
[2] Includes the extracted weight of product recovered from residue of last run.

It is preferred to recycle and reprocess the reaction mixture resulting from each run. In this manner efficiencies approaching theoretical can be achieved as can be seen from Table I.

Example II

The equipment used was a 50 gallon glass-lined reactor. A dropping funnel was provided with a dip tube extending to the bottom of the reactor. Two Pyrex reflux condensers, measuring two inches by ten feet, were connected in parallel and connected to the reactor. The discharge line from the condensers emptied into a 50 gallon glass-lined, closed receiver. A vacuum pump was connected through a Dry-Ice trap to the closed receiver.

The reactor was charged with 120 pounds (0.845 pound moles) of phosphorus pentoxide and 602 pounds (2.17 pound moles) of phosphorus tribromide. The fluid mixture was agitated and then the reactor was closed. The reactor was heated to about 100° C. and 354 pounds (2.22 pound moles) bromine was added through a diptube from a dropping funnel. The temperature was maintained at 100° C. throughout the addition of the bromine over a period of seven hours. The mixture was then agitated at 100° C. for a period of forty-eight hours.

The phosphorus oxybromide product in the reactor was then distilled at a pressure of 15–20 torr over a period of 16 hours at 10–120° C. A total of 999 pounds (3.48 pound moles) of phosphorus oxybromide was recovered. The efficiency was 82.4% based on phosphorus pentoxide, 94.0 percent based upon phosphorus tribromide and 94.4 percent based on bromine.

The reaction temperatures are maintained at less than the decomposition temperature of phosphorus pentabromide during the bromine addition because of the initial formation of phosphorus pentabromide by the reaction of phosphorus tribromide with bromine. The decomposition point of pure phosphorus pentabromide is about 105° C. and in general therefore it is preferred to maintain the reaction mixture at a temperature less than about 105° C., preferably between 90–105° C., during the bromine addition. After the bromine addition is complete, the resulting reaction mixture is heated, preferably between about 70°–170° C., for a period of time to achieve completion of the reaction.

In Example II, reduced pressure was used during the heating period after the bromine addition. It will be appreciated however, as can be seen from Example I and the runs shown in Table I, that reduced pressure is not necessary in order to achieve completion of the reaction.

The phosphorus oxybromide can be recovered by various means well known to the prior art. The solid residue in the reaction mixture can be removed by filtration. Alternatively the produce can be decanted from the reaction mixture. As in Examples I and II and the runs shown in Table I the product can be removed by distillation in order to provide a purer product.

The preferred method for the removal of phosphorus oxybromide from the reaction mixture is by distillation at reduced pressures. Reduced pressure is necessary during distillation because phosphorus oxybromide decomposes when boiled at atmospheric pressures. In certain instances it was found to be preferable to decant the phosphorus oxybromide product directly from the reaction mixture, thus facilitating the subsequent distillation of product where the forecut is to be recycled with the residue from the decanted phase. The residue from the decanted phase is essentially unreacted phosphorus pentoxide.

In Examples I and II and the runs shown in Table I, a molar excess of phosphorus pentoxide over that needed for stoichiometry was used and this is preferred. This was done to insure that all phosphorus pentabromide formed was converted to the desired product. However, it will be appreciated that a molar excess between 0–80% can be used, and this excess may be 60%–80%, corresponding to a molar ratio of phosphorus pentoxide to phosphorus tribromide between 1.6 and 1.8 to 3. A smaller molar excess is necessary when the reaction times are relatively long. Thus, in Example II the molar excess was about 15% and the total reaction time about fifty-five hours. In Example I and the runs shown in Table I, the reaction times were shorter (about 12 hours) and the molar excess was larger (about 71%). When the total reaction time is not important, it is preferred to use a smaller excess of phosphorus pentoxide in order to facilitate the separation of the phosphorus oxybromide product from the reaction mixture.

It was found that phosphorus oxybromide could be used to facilitate the fluidizing of the initial reaction mixture. It was found that other fluidizing materials could not be used because they caused an incomplete reaction. The use of phosphorus oxybromide was found to be particularly advantageous where substantial molar excess amounts of solid phosphorus pentoxide were used.

In certain instances it was found to be desirable to brominate elemental phosphorus and not use phosphorus tribromide. In this instance it was necessary to use a small amount of phosphorus oxybromide to fluidize the reaction. Illustrative is Example III.

Example III

The equipment used was the same as in Example I, except that a dip tube extending to the bottom of the flask from the end of the dropping funnel was used to add the bromine.

Air was excluded from the flask, comprising the reaction zone, and a mixture of phosphorus pentoxide (29.4 grams, 0.21 mole) and phosphorus oxybromide (476.0 grams, 1.7 moles) was provided in the flask to simulate a heel or residue such as that described in Table I. White phosphorus (94.0 grams, 3.0 moles) was introduced into the flask. Air was excluded from the flask to prevent the white phosphorus from reacting with oxygen.

This mixture in the flask was heated to 105° C. with a heating mantle and bromine was added from the dropping funnel at a ratio maintaining the resulting reaction mixture in a semi-fluid state. The reaction was quite exothermic and the heating mantle was removed after the bromine addition was begun. The bromine was added over a period of 1 hour with the temperature varying between 107°–153° C.

The reaction mixture from the bromine addition contained substantially phosphorus tribromide formed from the reaction of phosphorus with bromine, the molar ratio of phosphorus pentoxide provided to phosphorus tribromide formed being in excess of 1 to 3. The reaction mixture also contained phosphorus pentoxide and phosphorus oxybromide.

Additional phosphorus pentoxide (147 grams, 1.0 mole) was added to the reaction mixture with stirring. This provided a molar excess of phosphorus pentoxide over that needed for stoichiometry in the reaction mixture. The temperature of the reaction mixture was maintained between 98°–105° C. and additional bromine (480.0 grams, 3.0 moles) was added over a period of 1¼ hours. This and the succeeding steps are a repetition of the process of Example I.

After the bromine addition was complete the reaction mixture was heated slowly to a final temperature of 150° C. for a period of about 12 hours. After the reaction was complete the reaction slurry consisted essentially of unreacted phosphorus pentoxide and phosphorus oxybromide.

The reaction mixture was distilled as in Example I and an efficiency of 93.2% was found based upon bromine and phosphorus. Again, as in Example I, if the phosphorus oxybromide was recovered from the residue an efficiency of about 97% would result. Thus recycle of the residue was used to recover the phosphorus oxybromide.

Essentially the process of Example III is the same as that of Examples I and II except that the phosphorus tribromide is produced by the reaction of phosphorus and bromine by the reaction (2). The main advantages of the process of Example III are that phosphorus tribromide does not have to be isolated from the reaction mixture and that elemental phosphorus can be used which is less expensive to use than phosphorus tribromide.

Other forms of phosorus besides white phosphorus can be used. It will be appreciated that white phosphorus is preferred because of low cost.

In general it is preferred to use a slight molar excess of bromine over the molar amount of phosphorus tribromide. This can be seen in Examples II and III. This is done to insure that all of the phosphorus tribromide reacts to form phosphorus pentabromide. If unreacted phosphorus tribromide remains in the reaction mixture containing the phosphorus oxybromide product, separation of the product by distillation is more difficult, because both compounds are liquids and the boiling point difference is not very great.

It is preferred to initially react phosphorus with bromine at a temperature between about 105°–160° C. to form phosphorus tribromide. This reaction goes substantially to completion. After this step has been completed, the process of Examples I and II is completed, as seen from the further steps in Example III.

The prior art has produced phosphorus oxybromide by the reaction of phosphorus pentabromide with phosphorus pentoxide by the reaction (3). Illustrative of this prior art process is Comparative Example IV.

Comparative Example IV

Bromine (740.0 grams, 4.62 moles) was added to phosphorus tribromide (1260.0 grams, 4.62 moles) in a 1500 ml. beaker over a period of two hours. The reaction mixture was stirred under a stream of dry nitrogen to maintain anhydrous conditions. The product was principally solid phosphorus pentabromide.

The solid phosphorus pentabromide was mixed with solid phosphorus pentoxide (240.0 grams, 1.69 moles) under dry nitrogen, again to maintain anhydrous conditions. This mixture was transferred to a two liter, round bottom flask equipped with a reflux condenser with a calcium chloride filled glass tube on top. The solid mixture in the flask was heated for about 60 hours to a final temperature of 116° C. The final reaction mixture was fluid.

The reaction mixture was distilled at atmospheric pressure to a head temperature of 180° C., to yield a forerun of 33 grams. The main product fraction was distilled at 180°–193° C. head temperature and yielded a main fraction of 1886.5 grams, which was principally phosphorus oxybromide. The yield was 85.5 percent of theory.

As can be seen from Comparative Example IV, considerable difficulty arises in mixing and reacting the solid reactants and maintaining anhydrous reaction conditions. Further the reaction time must be very long (60 hrs.) in order to even approach the yields of Examples I, II and III. When a shorter reaction time was used with the process of Comparative Example IV, the yields were very low. These factors combine to make the process of Comparative Example IV difficult and uneconomical.

In contrast to Comparative Example IV the process of the present invention as illustrated in Examples I, II and III and the runs in Table I is simple and economical. This is particularly true where the reaction mixture from a previous run is recycled to a subsequent run and reprocessed. This could not be done in the process of Comparative Example IV. In the process of the present invention the reaction times are relatively short, the yields are high and the equipment needed for the reaction is relatively simple.

The process of the present invention was easily adaptable to large scale production. It was found that large scale runs can be conducted using the process of the present invention with results equivalent to Examples I and III, as can be seen from Example II. Thus the process of the present invention can be used to produce commercial quantities of phosphorus oxybromide.

It will be appreciated that the foregoing description is only illustrative of the present invention and that the present invention is to be limited only by the hereinafter appended claims.

We claim:

1. The process for the preparation of phosphorus oxybromide, by the reaction of phosphorus pentoxide, phosphorus tribromide and bromine, which comprises:
   (a) providing a semi-fluid mixture comprising phosphorus pentoxide and phosphorus tribromide at a temperature less than about 105° C., the molar ratio of phosphorus pentoxide to phosphorus tribromide being in excess of 1 to 3;
   (b) introducing bromine into the semi-fluid mixture at a rate which maintains the resulting reaction mixture in a semi-fluid state while heating at a temperature less than about 105° C., the molar ratio of total bromine added to phosphorus tribromide in the semi-fluid mixture being at least 1 to 1;
   (c) heating the reaction mixture so that the temperature is slowly increased above about 105° C. to a maximum of about 170° C. until substantially all of the phosphorus tribromide reacts to produce a liquid phosphorus oxybromide product; and
   (d) recovering the phosphorus oxybromide product from the resultant reaction mixture containing a residue.

2. The process of claim 1 wherein the phosphorus oxybromide product is recovered and purified by vacuum distillation.

3. The process of claim 1 wherein in addition phosphorus oxybromide is used as a fluiding medium for the process.

4. The process for the preparation of phosphorus oxybromide, by the reaction of phosphorus pentoxide, phosphorus tribromide and bromine, which comprises:
   (a) providing a semi-fluid mixture comprising phosphorus pentoxide and phosphorus tribromide at a temperature between about 90° C. and about 105° C., the molar ratio of phosphorus pentoxide to phosphorus tribromide being between about 1.6 and 1.8 to 3.
   (b) introducing bromine into the reaction mixture at a rate which maintains the resulting reaction mixture in a semi-fluid state and at a temperature between about 90° C. and 105° C., the molar ratio of total bromine added to phosphorus tribromide in the semi-fluid mixture being at least 1 to 1;
   (c) heating the reaction mixture so that the temperature is slowly increased above about 105° C. to a maximum of about 170° C. for about 10–15 hours to produce the liquid phosphorus oxybromide product in the reaction mixture; and
   (d) recovering the liquid phosphorus oxybromide product from the resultant reaction mixture containing a residue.

5. The process of claim 4 wherein the residue resulting from a previous performance of the process is combined with the starting semi-fluid mixture for reprocessing.

6. The process for the preparation of phosphorus oxybromide, by the reaction of phosphorus, bromine and phosphorus pentoxide which comprises:
   (a) providing in a reaction zone a semi-fluid mixture comprising phosphorus, phosphorus pentoxide and phosphorus oxybromide at a temperature between about 90°–105° C., air being excluded from the reaction zone;
   (b) introducing bromine into the semi-fluid mixture at a rate which maintains the resulting reaction mixture in a semi-fluid state at a temperature between about 105°–160° C. until substantially all of the phosphorus has reacted with the bromine to form phosphorus tribromide, the molar ratio of phosphorus pentoxide to phosphorus tribromide formed being in excess of 1 to 3;
   (c) introducing additional bromine into the reaction mixture at a rate which maintains the reaction mixture in a semi-fluid state and at a temperature between about 90°–105° C., the molar ratio of additional bromine to the phosphorus tribromide formed being at least 1 to 1;
   (d) heating the reaction mixture so that the temperature is slowly increased above about 105° C. to a maximum of about 170° C. until substantially all of the phosphorus tribromide reacts to produce phosphorus oxybromide product in the reaction mixture; and
   (e) recovering the liquid phosphorus oxybromide product from the resultant reaction mixture containing a residue.

7. The process of claim 6 wherein the residue resulting from a previous performance of the process is combined with the starting semi-fluid mixture and reprocessed.

References Cited

UNITED STATES PATENTS

| | | | |
|---|---|---|---|
| 1,921,370 | 8/1933 | North | 23—203 |
| 3,052,520 | 9/1962 | Draeger et al. | 23—203 |
| 3,119,666 | 1/1964 | Nametz | 23—205 |

OTHER REFERENCES

Mellor, Comprehensive Treatise on Inorganic and Theoretical Chemistry, vol. 8 (1928), p. 1030, Longmans, Green & Co., N.Y.

OSCAR R. VERTIZ, *Primary Examiner.*

B. H. LEVENSON, *Assistant Examiner.*